US009632312B1

(12) United States Patent
Cakmakci et al.

(10) Patent No.: US 9,632,312 B1
(45) Date of Patent: Apr. 25, 2017

(54) OPTICAL COMBINER WITH CURVED DIFFRACTIVE OPTICAL ELEMENT

(71) Applicant: Google Inc., Mountain View, CA (US)

(72) Inventors: Ozan Cakmakci, Sunnyvale, CA (US);
Anurag Gupta, Los Gatos, CA (US);
Bernard C. Kress, Redwood City, CA (US)

(73) Assignee: Google Inc., Mountain View, CA (US)

( * ) Notice: Subject to any disclaimer, the term of this patent is extended or adjusted under 35 U.S.C. 154(b) by 269 days.

(21) Appl. No.: 13/874,106

(22) Filed: Apr. 30, 2013

(51) Int. Cl.
*G02B 27/14* (2006.01)
*G02B 27/01* (2006.01)

(52) U.S. Cl.
CPC .................... *G02B 27/017* (2013.01)

(58) Field of Classification Search
CPC .......... G02B 27/017; G02B 2027/0178; G02B 27/0172; G02B 27/0101; G02B 27/283; G02B 6/34; G02B 27/30; G02B 2027/0138; G02B 5/10; G02B 27/1086; G02B 27/4205; G02B 5/18; G02B 5/1819; G02B 5/1842; G02B 27/01; G02B 5/1866; G03H 2223/21; B60R 1/001; B60R 2300/205
See application file for complete search history.

(56) References Cited

U.S. PATENT DOCUMENTS

| | | |
|---|---|---|
| 4,560,233 A | 12/1985 | Banbury |
| 4,799,765 A | 1/1989 | Ferrer |
| 5,050,966 A | 9/1991 | Berman |
| 5,237,455 A | 8/1993 | Bordo et al. |
| 5,537,253 A | 7/1996 | Cox et al. |
| 5,694,230 A | 12/1997 | Welch |
| 5,821,911 A | 10/1998 | Jachimowicz |
| 5,880,888 A | 3/1999 | Schoenmakers et al. |
| 5,886,822 A | 3/1999 | Spitzer |
| 5,943,171 A | 8/1999 | Budd et al. |
| 5,949,583 A | 9/1999 | Rallison et al. |

(Continued)

FOREIGN PATENT DOCUMENTS

| | | |
|---|---|---|
| EP | 0898726 | 3/1999 |
| EP | 0995145 | 4/2000 |

(Continued)

OTHER PUBLICATIONS

Cakmakci, O. et al., "Head-Worn Displays: A Review," Journal of Display Technology, vol. 2, No. 3, Sep. 2006, pp. 199-216, IEEE.

(Continued)

*Primary Examiner* — Alicia M Harrington
(74) *Attorney, Agent, or Firm* — Blakely Sokoloff Taylor & Zafman LLP

(57) ABSTRACT

An optical apparatus includes a first optical element having an eye-ward facing surface and an external world facing surface substantially opposite of the eye-ward facing surface. The optical apparatus also includes a diffractive optical element ("DOE") disposed to substantially follow a curvature of the eye-ward facing surface of the first optical element. The DOE includes a partially reflective diffraction grating configured to direct a portion of image light in an eye-ward direction where the image light is incident through an eye facing side of the DOE. The curvature of the eye-ward facing surface of the first optical element has an optical power configured to collimate the image light within an eyebox sized area.

19 Claims, 13 Drawing Sheets

(56) References Cited

U.S. PATENT DOCUMENTS

| | | | |
|---|---|---|---|
| 5,995,071 A | 11/1999 | Mertz | |
| 6,005,714 A | 12/1999 | Welch | |
| 6,057,966 A | 5/2000 | Carroll et al. | |
| 6,147,807 A | 11/2000 | Droessler et al. | |
| 6,204,975 B1 | 3/2001 | Watters et al. | |
| 6,236,509 B1 | 5/2001 | Grandjean et al. | |
| 6,236,511 B1 | 5/2001 | Brown | |
| 6,330,118 B1 | 12/2001 | Daschner et al. | |
| 6,349,004 B1 | 2/2002 | Fischer et al. | |
| 6,353,503 B1 | 3/2002 | Spitzer et al. | |
| 6,396,639 B1 | 5/2002 | Togino et al. | |
| 6,462,882 B2 | 10/2002 | Chen et al. | |
| 6,466,471 B1 | 10/2002 | Bhattacharyya | |
| 6,690,516 B2 | 2/2004 | Aritake et al. | |
| 6,829,095 B2 | 12/2004 | Amitai | |
| 6,847,488 B2 | 1/2005 | Travis | |
| 7,095,562 B1 | 8/2006 | Peng et al. | |
| 7,119,965 B1 | 10/2006 | Rolland et al. | |
| 7,145,726 B2 | 12/2006 | Geist | |
| 7,205,960 B2 | 4/2007 | David | |
| 7,230,766 B2 | 6/2007 | Rogers | |
| 7,450,310 B2 | 11/2008 | McGuire | |
| 7,542,209 B2 | 6/2009 | McGuire, Jr. et al. | |
| 7,566,863 B2 | 7/2009 | Chang et al. | |
| 7,595,480 B2 | 9/2009 | Kress | |
| 7,595,933 B2 | 9/2009 | Tang | |
| 7,637,617 B2 | 12/2009 | Liu et al. | |
| 7,656,585 B1* | 2/2010 | Powell et al. | 359/630 |
| 7,672,055 B2 | 3/2010 | Amitai | |
| 7,715,103 B2 | 5/2010 | Sprague et al. | |
| 7,724,442 B2 | 5/2010 | Amitai | |
| 7,821,715 B2 | 10/2010 | Suzuki et al. | |
| 8,384,999 B1 | 2/2013 | Crosby et al. | |
| 2002/0034016 A1 | 3/2002 | Inoguchi et al. | |
| 2002/0186179 A1 | 12/2002 | Knowles | |
| 2006/0215244 A1 | 9/2006 | Yosha et al. | |
| 2007/0070859 A1 | 3/2007 | Hirayama | |
| 2008/0186547 A1 | 8/2008 | Shimizu et al. | |
| 2009/0067057 A1 | 3/2009 | Sprague et al. | |
| 2009/0180194 A1 | 7/2009 | Yamaguchi et al. | |
| 2009/0201589 A1 | 8/2009 | Freeman | |
| 2010/0046075 A1 | 2/2010 | Powell et al. | |
| 2010/0079356 A1 | 4/2010 | Hoellwarth | |
| 2010/0149073 A1 | 6/2010 | Chaum et al. | |
| 2010/0238414 A1* | 9/2010 | Togino | 353/38 |
| 2011/0157709 A1* | 6/2011 | Togino | 359/643 |
| 2011/0213664 A1 | 9/2011 | Osterhout et al. | |
| 2011/0221656 A1 | 9/2011 | Haddick et al. | |
| 2012/0002294 A1* | 1/2012 | Dobschal | G02B 27/0172 359/630 |
| 2012/0212398 A1 | 8/2012 | Border et al. | |
| 2012/0212399 A1 | 8/2012 | Border et al. | |
| 2012/0293548 A1 | 11/2012 | Perez et al. | |
| 2013/0229712 A1* | 9/2013 | Kress | 359/572 |

FOREIGN PATENT DOCUMENTS

| | | |
|---|---|---|
| WO | WO 2007/065995 | 6/2007 |
| WO | WO 2009/153446 A2 | 12/2009 |
| WO | WO 2010/097439 A1 | 9/2010 |

OTHER PUBLICATIONS

Mukawa, H. et al., "8.4: Distinguished Paper: A Full Color Eyewear Display using Holographic Planar Waveguides," SID 08 Digest, 2008, pp. 89-92.

Cakmakci, O. et al., "Design of a Freeform Single-Element Head-Worn Display," Emerging Liquid Technologies V, Proc. of SPIE, vol. 7618, 761803, 2010, 6 pages.

Kress, Bernard et al., "Low Cost Replicable Plastic HUD combiner element", Photonics in the Transportation Industry: Auto to Aerospace II, Proc. SPIE vol. 7314, 73140I, Apr. 13, 2009, 8 pages, Orlando, Florida.

Kress, Bernard et al., "Digital combiner achieves low cost and high reliability for head-up display applications", SPIE Newsroom. DOI: 10.1117/2.1200904.1599, May 18, 2009, 3 pages.

Kress, Bernard et al., "Applied Digital Optics: From Micro-optics to Nanophotonics, Chapter 5: Digital Diffractive Optics: Analytic Type", 40 pages, 2009, John Wiley & Sons, Ltd.

Kress, Bernard et al., "Applied Digital Optics: From Micro-optics to Nanophotonics, Chapter 12: Digital Optics Fabrication Techniques", 74 pages, 2009, John Wiley & Sons, Ltd.

Kress, Bernard et al., "Applied Digital Optics: From Micro-optics to Nanophotonics, Chapter 14: Replication Techniques for Digital Optics", 27 pages, 2009, John Wiley & Sons, Ltd.

Kress, Bernard et al., "Applied Digital Optics: From Micro-optics to Nanophotonics, Chapter 16: Digital Optics Application Pools", 60 pages, 2009, John Wiley & Sons, Ltd.

* cited by examiner

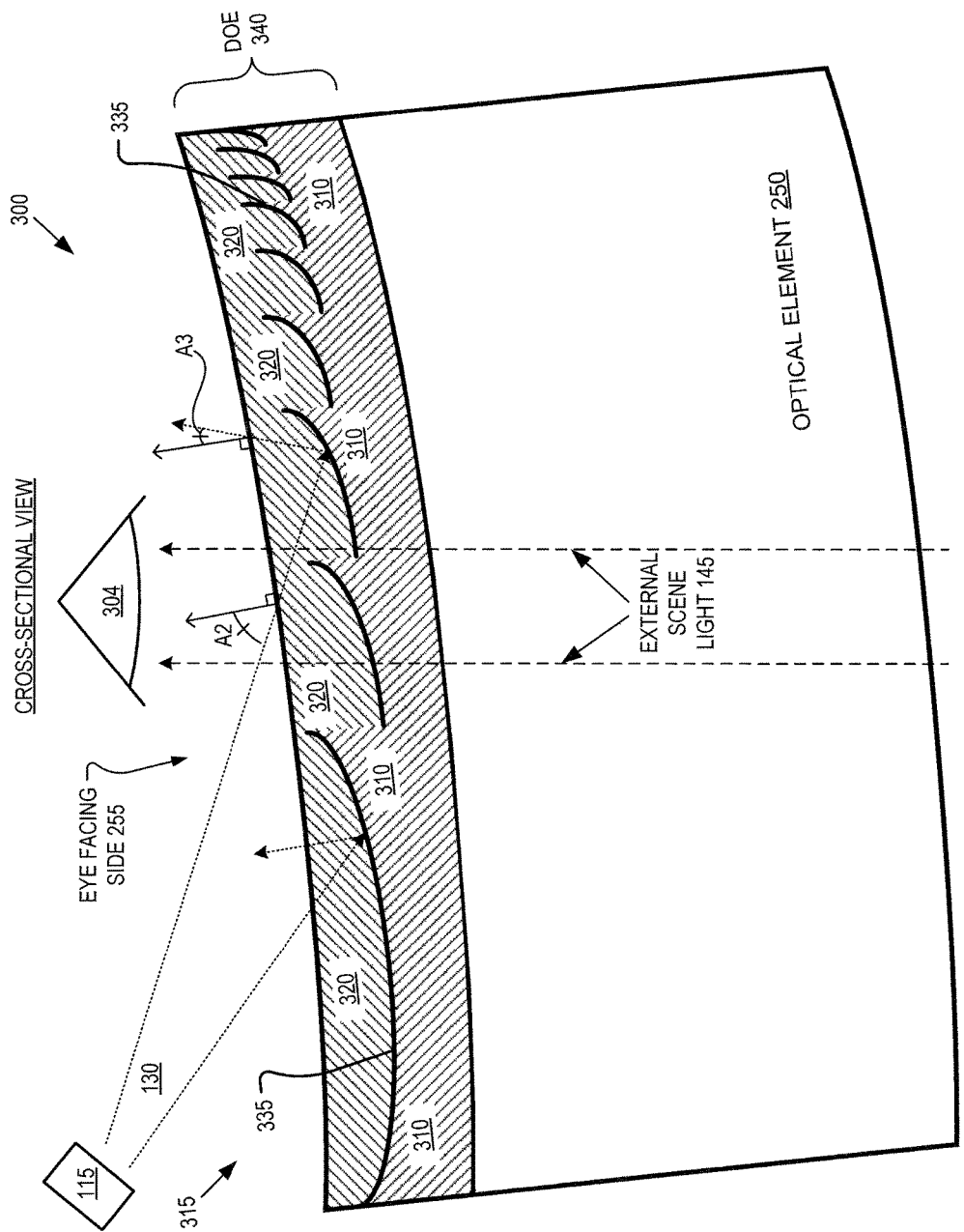

OPTICAL COMBINER WITH CURVED DIFFRACTIVE OPTICAL ELEMENT

TECHNICAL FIELD

This disclosure relates generally to the field of optics, and in particular but not exclusively, relates to head-worn displays.

BACKGROUND INFORMATION

In the field of optics, a combiner is an optical apparatus that combines two images together, from either the same side of the combiner (reflective/reflective, or transmissive/transmissive) or from the two different sides of the combiner (reflective/transmissive). Often times, optical combiners are used in heads up displays ("HUDs"), sometimes referred to as head mounted displays ("HMDs") or near-to-eye displays, which allow a user to view a display image superimposed over an external view. The HUD enables the user to view the display image without having to look away from her usual viewpoint. The term HUD originated from its use in avionics, which enabled a pilot to view information while looking forward with his head up, as opposed to looking down at an instrument panel. Conventional HUD combiner implementations include tilted dichroic plates, holographic combiners, transparent substrates used at an angle (e.g., beam splitters), and zero power shells. Two versions of combiners exist. The first version combines two fields without adding any optical power to either field (typically a tilted dichroic plate or zero power shell). The second version has optical power, in addition to the combining functionality. The optical power is used to form a virtual magnified image of a microdisplay located at a specific distance from the combiner. Field of view is set by the application requirements. The field of view and the desired microdisplay diagonal determine the focal length (inversely related to the optical power) of the optical combiner.

Holographic combiners that provide a high quality HUD are typically used in military applications, although their cost is relatively expensive. Holographic combiners can be fabricated by exposing a dichromated gelatin, silver halides, or photopolymers to a pair of intersecting laser beams (reference and object beams). The interference pattern between these beams is recorded into the holographic media thereby forming the holographic combiner after curing. Holographic combiners have a number of drawbacks. They are expensive to fabricate, difficult to mass produce, and have limited life spans (e.g., begin to degrade due to temperature, humidity, pressure and other harsh environmental conditions).

Angled transparent substrate combiners (e.g., beam splitters) have been used in automobiles to present the driver with HUD information on the windshield. These optical combiners are made of a clear see-through substrate upon which an external image source displays computer generated images ("CGI"). However, since the clear see-through substrate is typically a flat substrate without optical power so as not to distort the external FOV, the clear substrate must be angled (e.g., near 45 degrees) and bulky external magnification lenses are used to expand the display image over the display region. The bulky external lenses and angled nature of the clear see-through substrate combiners do not lend themselves well to compact arrangements, such as HMDs.

The above mentioned optical combiners each have their own respective drawbacks, which have limited their use to niche markets. In order to broaden the adoption of an HMD outside of a particular niche market, such an HMD should be implemented with a low cost optical combiner that is compact, lightweight, durable, and provide a good quality image without undue optical aberration.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 3 shows layers of a curved diffractive optical combiner having a partially reflective diffractive optical element, in accordance with an embodiment of the disclosure.

DETAILED DESCRIPTION

Embodiments of an apparatus, system, and method of fabrication of a see-through near-to-eye-display including a curved diffractive optical combiner are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
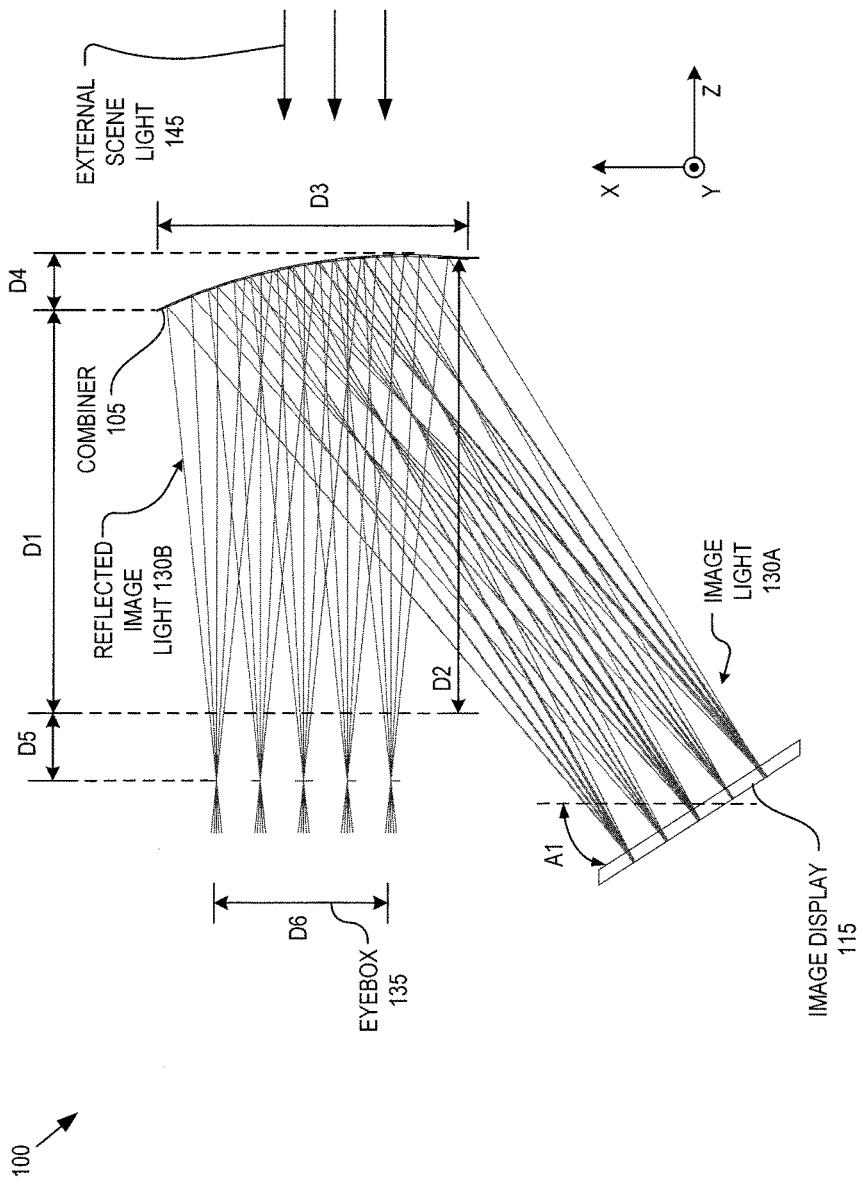
FIG. 1 illustrates an optical system including a curved diffractive optical combiner directing image light from an image display into an eyebox area, in accordance with an embodiment of the disclosure.

FIG. 1 illustrates an optical system 100 including a curved diffractive optical combiner 105 directing image light 130 from an image display 115 into an eyebox area 135, in accordance with an embodiment of the disclosure. During operation, image display 115 emits image light 130 along an emission path that directs image light 130 to be incident upon an eye facing side 255 of curved diffractive optical combiner 105.

Figure 2A:
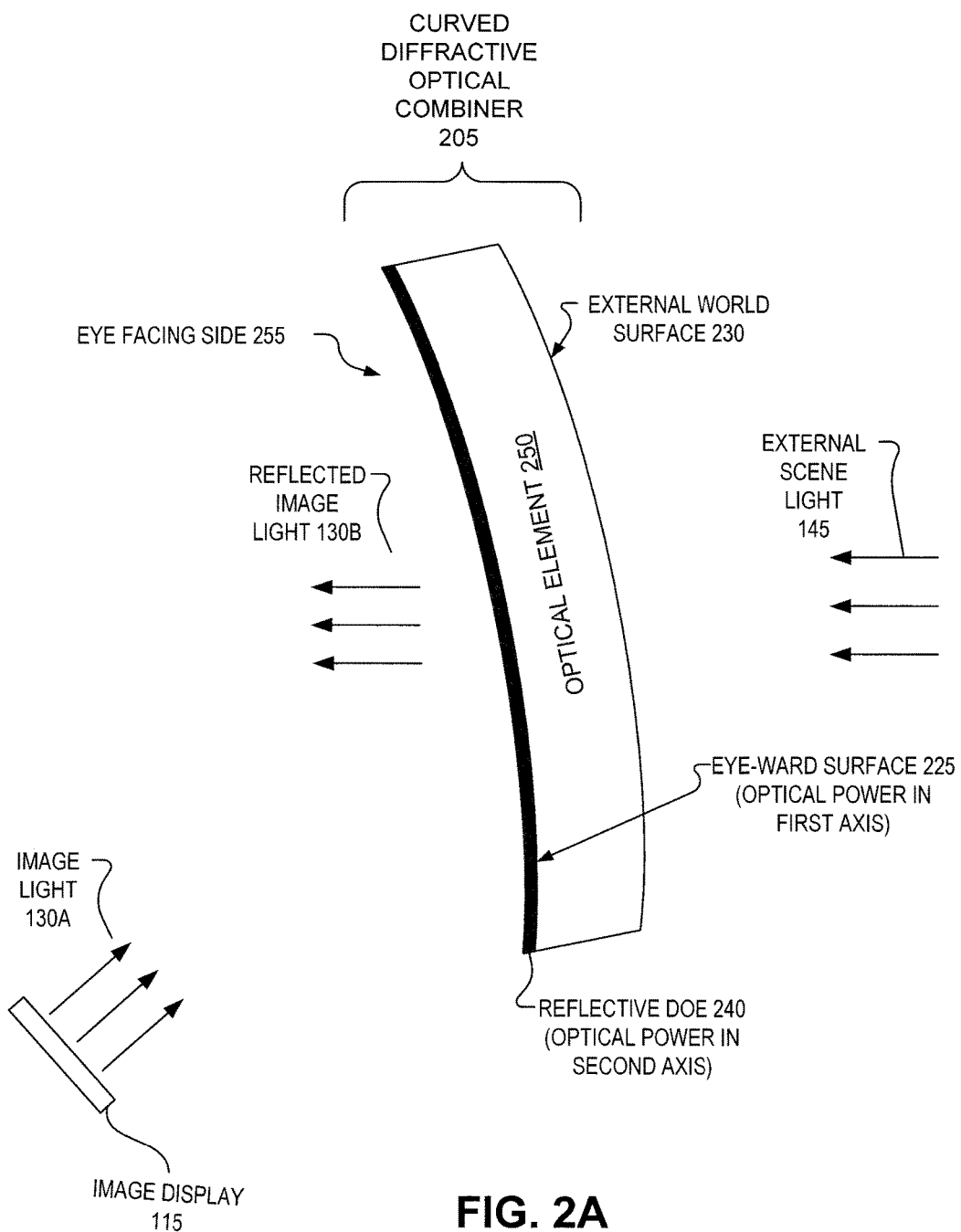
FIG. 2A illustrates a curved diffractive optical combiner that includes a partially reflective diffractive optical element following a curvature of an optical element, in accordance with an embodiment of the disclosure.

FIG. 2A shows a more detailed illustration of an example curved diffractive optical combiner 205 that includes a partially reflective diffractive optical element 240 following a curvature of optical element ("OE") 250, in accordance with an embodiment of the disclosure. Curved diffractive optical combiner 205 is one example of curved diffractive optical combiner 105. In the illustrated embodiment, curved diffractive optical combiner 205 includes OE 250 having an eye-ward facing surface 225 and an external world surface 230 that is substantially opposite the eye-ward facing surface 225. In one example, the external world surface 230 and the eye-ward facing surface 225 are spaced approximately 2 mm apart, although thinner and wider examples are possible. OE 250 is at least partially transparent to allow external scene light 145 to propagate through OE 250.

Curved diffractive optical combiner 205 also includes a partially reflective diffractive optical element ("DOE") 240 that is disposed to substantially follow a curvature of eye-ward facing surface 225. In FIG. 2A, reflective DOE 240 is contacting eye-ward facing surface 225 and thus conforms to its curvature. However, in other embodiments, DOE 240 may still conform to the curvature of eye-ward facing surface 225 without directly contacting eye-ward facing surface 225.

Referring back to FIG. 1, curved diffractive optical combiner 105 partially reflects image light 130 collimates it within eyebox 135 which is setback from diffractive optical combiner 105 by an eye relief dimension. Since curved diffractive optical combiner 105 is curved, the eye relief dimension may vary between the sum of D1 and D5 to the sum of D2 and D5. Dimension D5 is meant to represent an approximate distance from a corneal surface and a pupil of an eye. In one embodiment, D5 is approximately 3.5 mm. In one embodiment, curved diffractive optical combiner 105 magnifies and collimates the image light 130 so that the image can be brought into focus by the human eye in a near-to-eye configuration.

Figure 9:
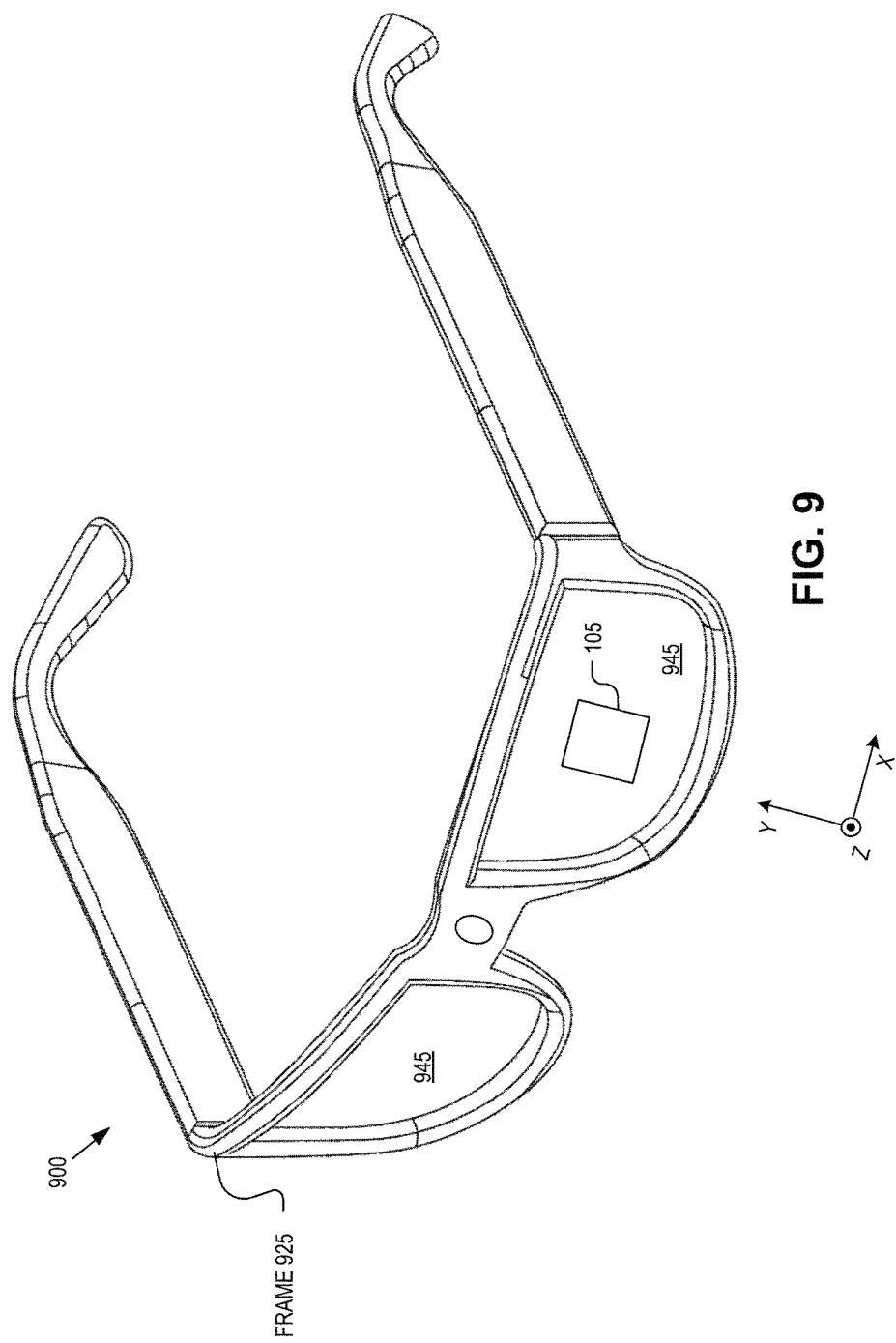
FIG. 9 shows a curved diffractive optical combiner fixed in a lens of a head mounted display.

A frame assembly may be used to support the components of optical system 100 such that curved diffractive optical combiner 105 is positioned in front of a user's eye by a distance that places the user's pupil within eyebox 135. For example, in one embodiment, D1 is approximately 18.7 mm, D2 is approximately 21 mm, D5 is approximately 3.5 mm, and D6 is approximately 8 mm. In one example, dimension D4 is 2.3 mm. In one example, dimension D3 (which corresponds to an x-axis dimension) is 14 mm and the y-axis dimension may also be 14 mm. In that example, DOE 240 and ROE 250 would each be approximately 14 mm×14 mm to form combiner 105. FIG. 9 shows a better view of example x and y dimensions of combiner 105 in an example where combiner 105 is fixed in a lens 945 of an HMD 900. In the illustrated embodiment of FIG. 1, image display 115 is angled at an angle A1 from a vertical plane of eyebox 135. In one embodiment, angle A1 is approximately 33 degrees. Other dimensions than those given by these examples may be implemented for different designs.

Since the illustrated embodiment of optical system 100 is configured into a see-through near-to-eye display, curved diffractive optical combiner 105 is at least partially transmissive to external scene light 145 incident through an external world surface 230 of curved diffractive optical combiner 105. Image light 130 is perceived by the user as an image that is superimposed over external scene light 145 (e.g., image light 130 augments external scene light 145).

Conventional diffractive elements that are positioned to reflect image light may induce various optical aberrations in the image light they reflect. These optical aberrations may include spherical aberration, coma, astigmatism, distortion, and lateral color. In the embodiments of the disclosure, the color blur may be addressed by using a single color or monochromatic display source (e.g. image display 115). In one embodiment, image display 115 emits a single color or narrow band image light (e.g., centered about 524 nm or otherwise). Image display 115 may be implemented using a laser source, a laser diode lamp that illuminates a liquid crystal on silicon (LCoS) display or an liquid crystal display (LCD), a quantum dot array, or otherwise. A broad band lamp source with a narrow band filter may also be used. Of the remaining optical aberrations, astigmatism is the dominant aberration that detracts from the image quality.

To influence or correct for astigmatism introduced into image light 130, the optical powers of both reflective DOE 240 and the curvature of OE 250 are utilized. The optical power of DOE 240 may be along a first axis, while the optical power of OE 250 may be along a second axis. In one embodiment, the first axis is orthogonal to the second axis. By configuring the optical power and axis of DOE 240 and OE 250, one can influence or correct for astigmatism introduced in to image light 130.

The optical power of optical element 250 stems from the curvature of eye-ward facing surface 225 as it reflects image light 130, while the optical power of DOE 240 stems from the configuration of a partially reflective diffraction grating within DOE 240, which will be discussed in greater detail below. Of course, those skilled in the art appreciate that diffraction gratings may be designed to include lensing functionality to generate optical power similar to the lensing functionality of refractive lenses.

In the embodiment illustrated in FIG. 2A, external world surface 230 is configured to give OE 250 substantially zero transmissive optical power from the perspective of scene light (propagating in an eye-ward direction) encountering OE 250. In other words, external scene light 145 that is incident through the external world surface 230 continues to travel substantially along the same optical path as it propagates through OE 250 because, in one example, external world surface 230 follows the curvature of eye-ward facing surface 225. In an alternative embodiment, OE 250 has transmissive optical power that focuses external scene light 145. If OE 250 has transmissive optical power to focus external scene light 145, the transmissive optical power may be configured to correct the vision of a wearer of a head mounted display ("HMD") that incorporates a curved diffractive optical combiner, in accordance with this disclosure.

In one example, eye-ward facing surface 225 has an x-radius of curvature of approximately 27.5 mm and a y-radius of curvature of infinity, meaning eye-ward facing surface 225 has a cylindrical surface and the 27.5 mm x-radius of curvature defines the optical power (in reflection) of OE 250. In other examples, eye-ward facing surface 225 is spherical or toroidal and has corresponding radii of curvatures.

Figure 4:
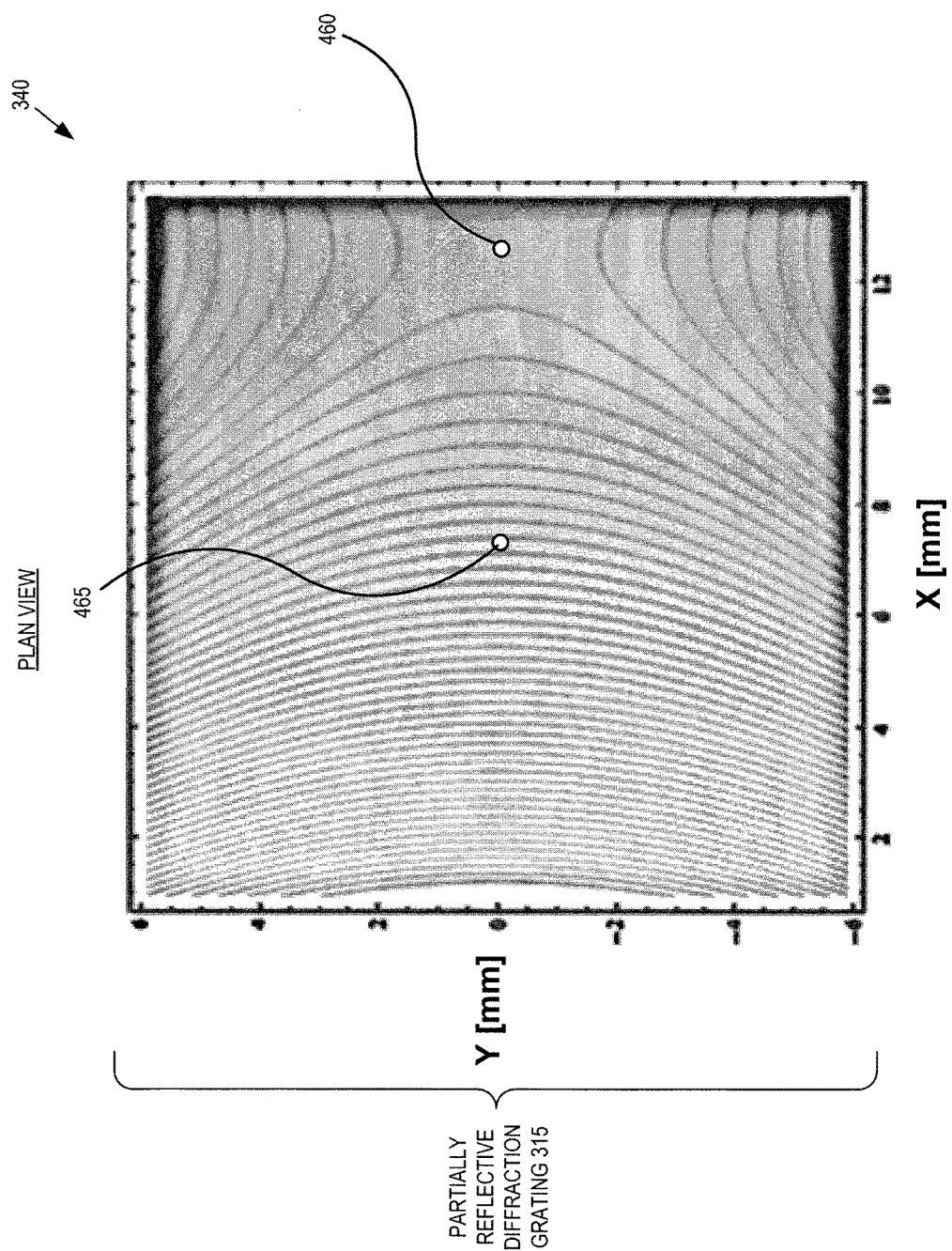
FIG. 4 is a plan view of a partially reflective diffraction grating, in accordance with an embodiment of the disclosure.

FIG. 3 illustrates an optical system 300 including reflective DOE 340 and OE 250, in accordance with an embodiment of the disclosure. FIG. 3 illustrates a cross-sectional view of DOE 340 and OE 250 while FIG. 4 illustrates a plan view of DOE 340. Optical system 300 is one possible implementation of optical system 100 (illustrated in FIG. 1) and correspondingly, DOE 340 is one possible implementation of DOE 240. It is appreciated that DOE 340 and OE 250 are drawn for illustration purposes and may not be drawn to scale.

The illustrated embodiment of optical system 300 includes image display 115, DOE 340, and optical element 250. The illustrated embodiment of DOE 340 includes a base sandwich layer 310, a partially reflective diffraction grating 315, and a finishing sandwich layer 320. The illustrated embodiment of partially reflective diffraction grating 315 is formed of a two-dimensional ("2D") array of three-dimensional ("3D") diffraction element shapes formed into base sandwich layer 310 with partially reflective elements 335 coated onto the 3D diffraction element shapes and conforming thereto.

DOE 340 may be referred to as a sandwiched optical element since it sandwiches partially reflective diffraction grating 315 between two material layers (i.e., base sandwich layer 310 and finishing sandwich layer 320) having substantially equal, if not identical, indexes of refraction. By doing this, DOE 340 simultaneously operates in both reflection and transmission modes with each mode having different characteristics. Image display 115 is positioned on the same side of DOE 340 as the user's eye 304 (i.e., eye-ward side 325). In reflection mode, a portion of image light 130 output from image display 115 is reflected back towards the user's eye 304 since partially reflective diffraction grating 315 is composed of partially reflective elements 335. In transmission mode, the diffractive effects of reflective diffraction grating 315 are nullified by using the same or similar index of refraction material above and below partially reflective elements 335. Since partially reflective elements 335 are also partially transmissive and sandwiched in substantially uniform index material(s), the portion of external scene light 145 that passes through partially reflective diffraction grating 315 is not diffracted, but rather passes to eye 304 substantially without experiencing optical distortion or power. By simultaneously utilizing DOE 340 in both reflective and transmissive modes, it can be used to overlay image light 130 onto external scene light 145 to provide a type of augmented reality to the user.

In some embodiments, the shape, size, orientation, and placement of the individual 3D diffraction element shapes formed into base sandwich layer 310 may be designed to provide magnifying optical power for magnifying image light 130. This magnifying configuration may be particularly useful in near-to-eye configurations, such as head mounted displays ("HMDs") and some types of heads up displays ("HUDs"), such as scopes. The generic design of diffraction gratings that provide optical power is well known. For example, design of diffractive optics is discussed in "Applied Digital Optics: From Micro-optics to Nanophotonics" by Bernard Kress and Patrick Meyrueis, published by John Wiley and Sons in 2009. In particular, this book discusses how to design and subsequently carve out diffraction structures (microscopic grooves) and select their depth to maximize the amount of light diffracted in a specific diffraction order, while reducing the light diffracted in the zero and higher diffraction orders. In one embodiment, partially reflective diffraction grating 315 is an off-axis lens, which is capable of receiving image light 130A at incident angle A2 and reflects the image light 130B along a reflection path having an emission angle A3 that is different from A2. Note, A2 and A3 are measured from the normal of the emission surface of DOE 340 out which the reflected image light 130B is emitted. In FIG. 3, the emission surface coincides with eye facing side 255 of finishing sandwich layer 320. In one embodiment, incident angle A2 (e.g., 42 degrees) is greater or more oblique from normal than emission angle A3 (e.g., zero degrees). This enables image display 115 to be positioned laterally to DOE 340 so as not to block external scene light 145. In HMD configurations, off-axis lensing permits image display 115 to be positioned peripherally in the temple region of the user thereby not obstructing the user's forward vision. The off-axis lensing redirects the emission angle A3 to be less oblique from normal than the incident angle A2, thereby directing the reflected image light into the user's eye at a closer to normal angle, versus overshooting the eye and illuminating the nose. Angle A3 is determined both by the surface normal and the gradient profile of DOE 340. Off-axis lensing using diffractive optics also provides a specific angular bandwidth to partially reflective diffraction grating 315. This helps reduce distractions due to backside reflections and improve contrast of the reflected image light 130 over external scene light 145. Partially reflective diffraction grating 315 may have a phase that is either rotationally symmetric or non-rotationally symmetric.

In FIG. 4, the off-axis lensing is achieved by chirping the diffraction grating pattern and offsetting the center 460 of the diffraction pattern relative to the user's center of vision 465. As the pattern extends out from center 460, partially reflective elements 335 become gradually smaller. In FIGS. 3 and 4, the 3D diffraction element shapes have cross-sectional shapes (see FIG. 3) prescribed by the phase function Phase (x,y) below and can in general be rotationally symmetric (circular or spherical lens) or non-rotationally symmetric (aspheric lens) perimeter shapes (see FIG. 4). However, other cross-sectional shapes and perimeter shapes (e.g., elliptical, etc.) may be used to create partially reflective diffraction grating 315. The illustrated embodiment of FIG. 4 can be implemented as a 16 phase level off-axis diffractive lens; however, other number of phase levels may be used, the most effective lens having an infinite number of phase levels (quasi analog surface relief diffractive lens).

In one embodiment where eye-ward surface 225 is a cylindrical surface, partially reflective diffraction grating 315 is defined by the following phase polynomial:

$$\text{Phase}(x,y) = C1x + C2x^2 + C3y^2 + C4x^3 + C5x^5 + C6x^4y^2 + C7x^6y^2 + C8x^7y^2 + C9x^8y^2 \qquad (1)$$

where C1, C2, C3, C4, C5, C6, C7, C8, and C9 are coefficients and x and y represent the x and y dimensions in mm. In one embodiment, C1=−0.57969, C2=0.02118, C3=−0.016461, C4=3.63954e−005, C5=1.5689e−008, C6=7.48180e−007, C7=−2.459952e−008, C8=2.62093e−009, and C9=−8.09148e−011 while the diffraction order is +1 and for a wavelength of 645 nm. Of course, partially reflective diffraction grating 315 may be implemented with other coefficient values and at other wavelengths.

Partially reflective diffraction grating 315 is formed by overlaying each 3D diffraction element shape with a partially reflective element 335. Partially reflective elements 335 each conformally coat a corresponding 3D diffraction element shape thereby creating a reflective structure that assumes the shape and orientation of the underlying 3D diffraction element shape.

Partially reflective elements 335 may be made of a variety of different materials. In one embodiment, partially reflective elements 335 are fabricated of a layer of conventional non-polarizing beam splitter material (e.g., thin silver layer, CrO2, etc.). The degree of reflectivity may be selected based upon the particular application (e.g., primarily indoor use, outdoor use, combination use, etc.). In one embodiment, partially reflective elements 335 comprise a 10% reflective 100 nm layer of CrO2.

In one embodiment, partially reflective elements 335 are fabricated of a multi-layer dichroic thin film structure. Dichroic films can be created to have a selectable reflectivity at a selectable wavelength. Additionally, the dichroic film can be designed to improve the angle selectivity of the partially reflective diffraction grating 315. A dichroic film can be designed with high reflectivity to a specific wavelength or wavelength band that overlaps with image light 130 and to the angles of incidence of image light 130, while being substantially more transparent to other visible spectrum wavelengths and to the normal incidence of external scene light 145. In this manner, the efficiency of DOE 340 can be improved while also increasing the brightness of the transmitted external scene light 145.

In one embodiment, partially reflective elements 335 are fabricated of polarizing beam splitter material that substantially reflects one linear polarization of incident light while substantially passing the orthogonal linear polarization. In this case, image display 115 could be designed to emit polarized image light matching the reflection characteristic of partially reflective elements 335. Since ambient light typically has a random polarization, approximately 50% of external scene light 230 would pass through DOE 340 to eye 304.

Image display 115 may be fabricated using a variety of compact image source technologies such as the various micro-displays used today in pico-projectors, liquid crystal on silicon ("LCOS") displays, backlit liquid crystal displays, organic light emitting diode ("OLED") displays, quantum dot array displays, light emitting diode ("LED") arrays, or otherwise. In one embodiment, the planar dimensions of image display 115 are 7.2 mm by 5.4 mm. Image display 115 should be configured to provide a single color or narrow spectral band image light. Diffractive DOE 340 may be fabricated of a variety of clear optically transmissive materials, including plastic (e.g., acrylic, thermo-plastics, poly-methyl-metha-crylate (PMMA), ZEONEX-E48R, glass, quartz, etc.). For example, in one embodiment, base sandwich layer 310 and finishing sandwich layer 320 are fabricated of plastic. In another embodiment, sandwich layer 310 and finishing sandwich layer 320 are fabricated of silicon dioxide. Of course, other material combinations may be used. In some embodiments, sandwich layer 310 may be disposed on a substrate layer (not shown in FIG. 3) and that substrate layer may be disposed between OE 250 and DOE 240/340.

Figure 5:
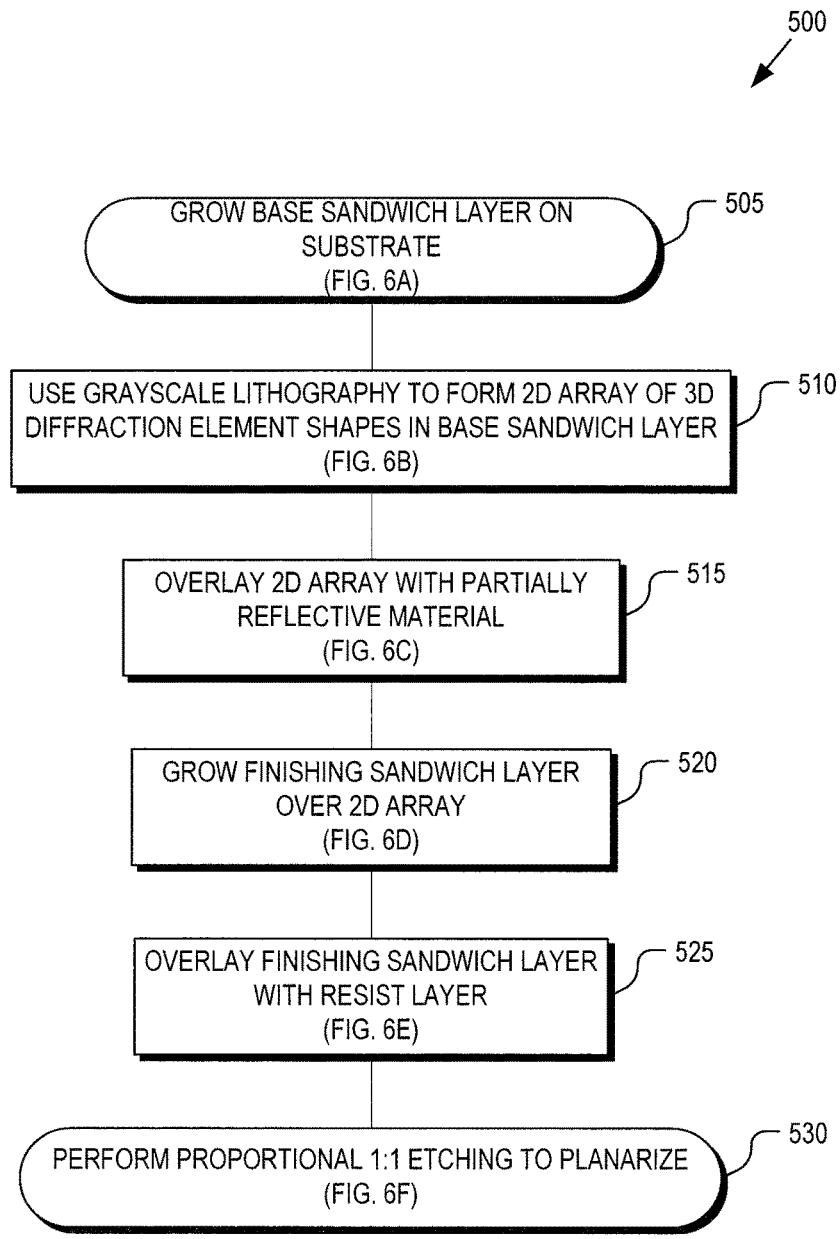
FIG. 5 is a flow chart illustrating a process for fabricating a diffractive optical element using lithography, in accordance with an embodiment of the disclosure.
Figure 6A:
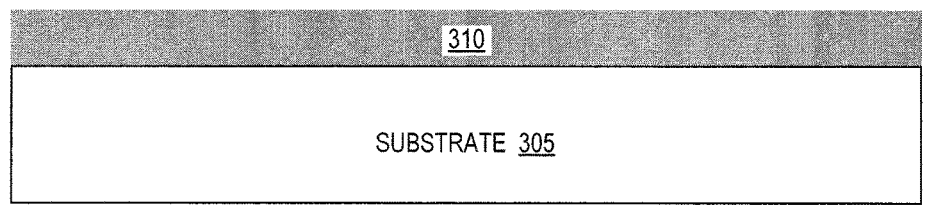
FIGS. 6A-6F illustrate fabrication steps for fabricating a diffractive optical element using lithography, in accordance with an embodiment of the disclosure.
Figure 6B:
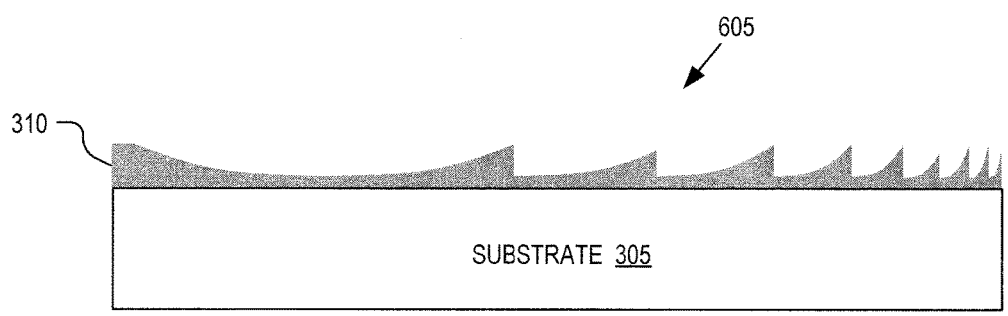
Figure 6C:
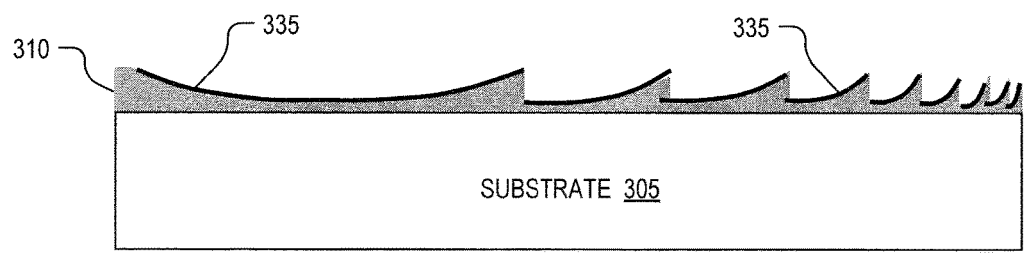
Figure 6D:
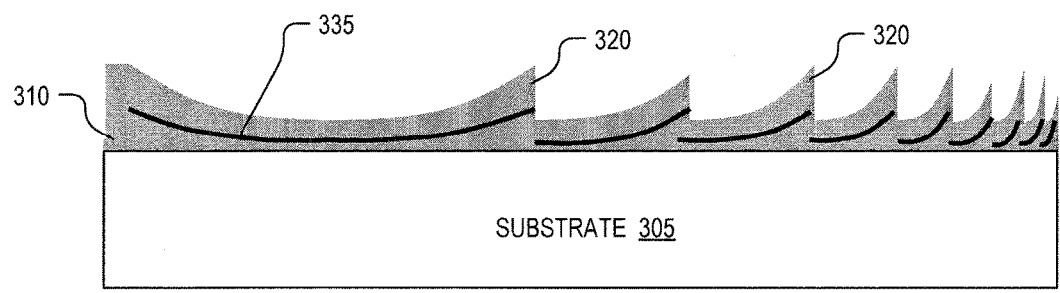
Figure 6E:
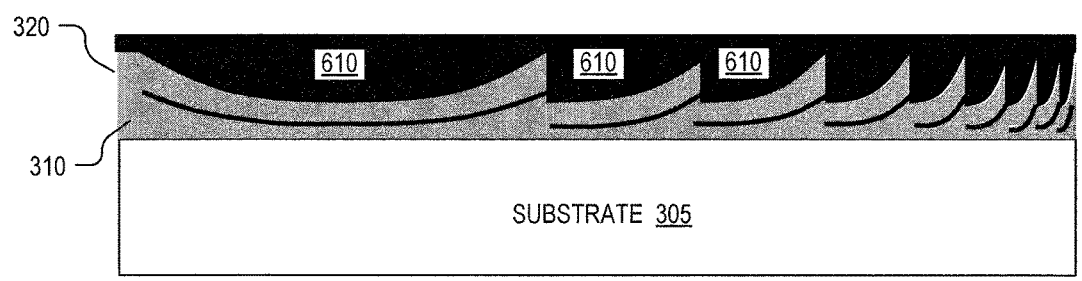
Figure 6F:
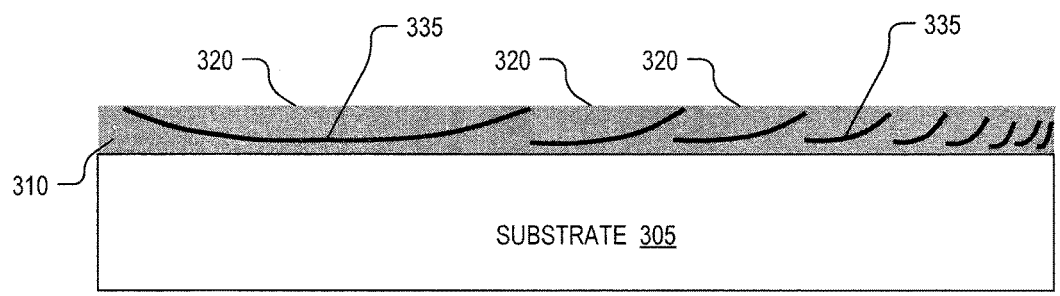

FIG. 5 is a flow chart illustrating an example process 500 for fabricating one embodiment of sandwiched DOE 340 using lithography, in accordance with an embodiment of the disclosure. Process 500 describes one technique for fabricating an embodiment of DOE 340. Process 500 is described with reference to FIGS. 6A-F. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

Figure 2B:
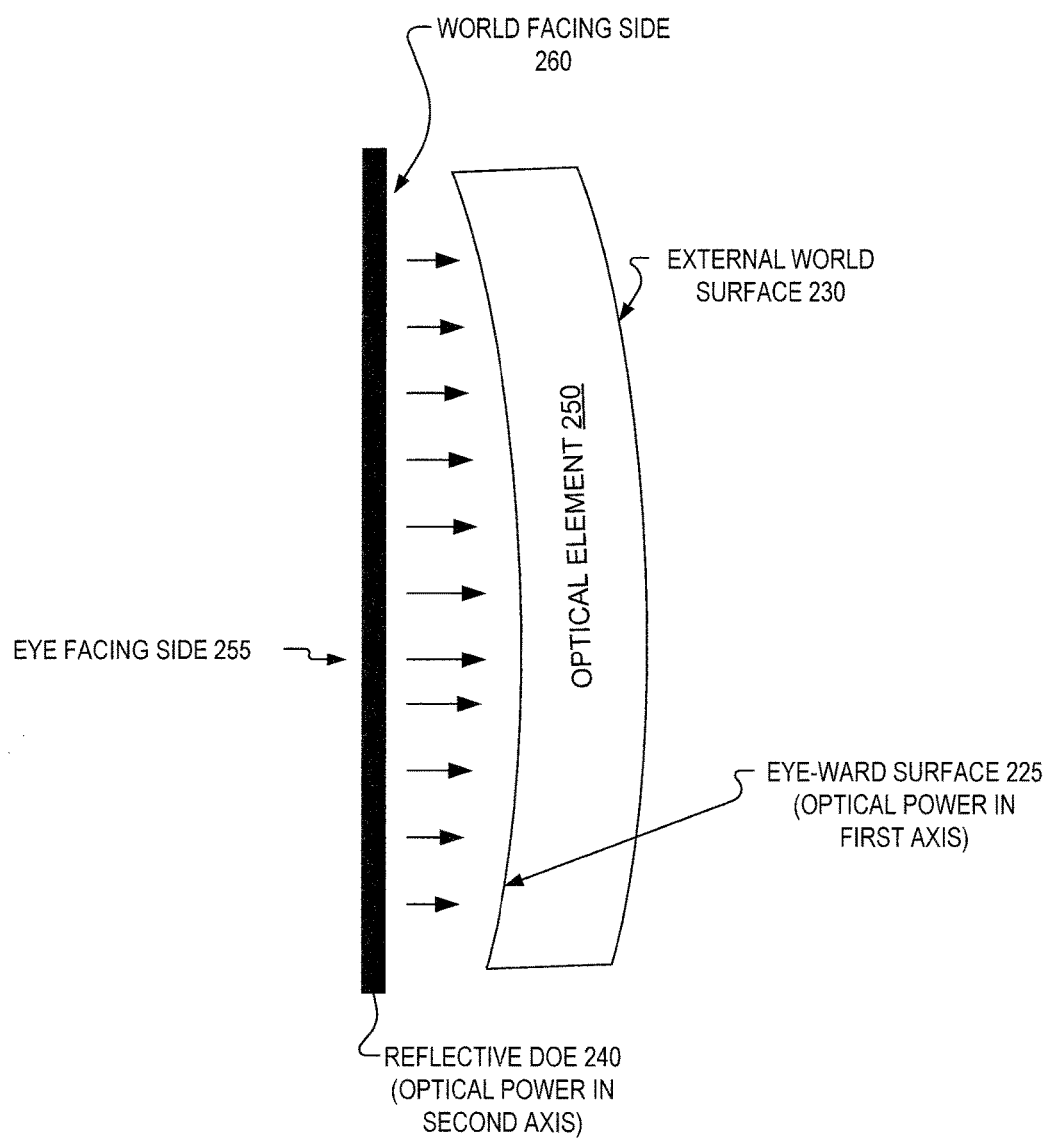
FIG. 2B illustrates a partially reflective diffractive optical element prior to being fixed to a curvature of an optical element, in accordance with an embodiment of the disclosure.

Although process 500 shows a process for fabricating sandwiched DOE 340 on a flat surface, the same process could be carried out on a curved surface, using OE 250 in place of substrate 305, for example. However, even if process 500 is carried out on a flat substrate 305, substrate 305 and sandwiched DOE 340 may be sufficiently thin and flexible to be applied to eye-ward facing surface 225 of OE 250. FIG. 2B shows how an initially flat (but sufficiently flexible) DOE 240/340 could be applied to conform to the curvature of eye-ward facing surface 225.

In FIGS. 2A and 2B, the base curvature of OE 250 is illustrated as a cylindrical surface having optical power (in reflection) along only one axis. However, the base curvature of OE 250 could be a toroidal surface having a first optical power along a first axis and a second optical power along a second axis and both the first optical power and the second optical power could be used to influence astigmatism.

For manufacturing reasons, one potential advantage of having OE 250 be a cylindrical surface (having optical power along only one axis) is that a cylindrical surface may be a better recipient of DOE 240/340 if DOE 240/340 and OE 250 are initially manufactured separately. For example, in one embodiment, OE 250 is manufactured and DOE 240 is produced separately. Because DOE 240 may be relatively thin and flexible, it can be adhered to OE 250 much like a sticker placed onto a surface. And, since OE 250 would have a cylindrical eye-ward facing surface 225, DOE 240 could be applied to the cylindrical surface without wrinkling DOE 240. In contrast, if DOE 240 has an eye-ward facing surface 225 that has a spherical or toroidal curvature, it may not be as straight-forward to apply DOE 240 without wrinkling DOE 240.

Turning to process 500, in a process block 505, base sandwich layer 310 is deposited onto substrate 305, which may be fabricated of a clear material such as glass, quartz, plastic, or otherwise. In this embodiment, base sandwich layer 310 is a layer of silicon dioxide approximately 1 μm thick. In a process block 510, grayscale lithography and reactive ion etching is used to form the 2D array of 3D diffraction shapes 605 into base sandwich layer 310. In a process block 515, shapes 605 are overlaid via sputtering with a layer of partially reflective material. In one embodiment, the partially reflective material layer is approximately 10% reflective (other reflectivity percentages may be used). In one embodiment, the partially reflective material layer is approximately 100 nm thick of CrO2 material. In a process block 520, finishing sandwich layer 320 is deposited onto of the partially reflective material layer. In one embodiment, finishing sandwich layer 320 is deposited to be approximately 1.5 μm thick. Of course, at this stage (FIG. 6D) finishing sandwich layer 320 is still uneven. In a process block 525, a resist material 610 is coated over finishing sandwich layer 320. Finally, in a process block 530, resist material 610 is removed during finishing, which proceeds to a depth that results in a planar (or otherwise smoothed) top to finishing sandwich layer 320. Such a process can be implemented as a proportional reactive ion etching (RIE) process (or CAIBE process—Chemically Assisted Ion Beam Etching) where the resist etching rate and the underlying SiO2 etching rate are exactly similar. In one embodiment, chemical-mechanical polishing is used to remove resist layer 610 and planarize finishing sandwich layer 320. In one embodiment, a proportional reactive ion etch with a 1:1 ratio that etches both resist material 610 and finishing sandwich layer 320 at the same rate is used. Other standard or custom finishing techniques may be used.

Mass production techniques may be used to fabricate various other embodiments of diffractive DOE 340. For example, a master combiner may be fabricated to be used as a mold for plastic replication via injection molding or hot/UV embossing. Base sandwich layer 310 may be fabricated of thermo-plastic material that is injection molded. Partially reflective elements 335 may be overlaid or coated onto the 2D array of 3D diffraction shapes and finishing sandwich layer 320 laminated over the partially reflective material.

Diamond turning with CNC machine-tools may be used in place of lithography to shape the various curved fringes making up the optical combiner. In some embodiments, the minimum period for the diffractive grating (e.g. diffractive grating 315) may be on the order of 1 micron. While diamond turning guidelines in the optical design community are sometimes on the order of 10 microns, diffractive gratings with 2 micron periods have been fabricated in integrated optics applications, and may be necessary in some embodiments of this disclosure. It should be noted that having a curved combiner (such as those disclosed) may help increase the minimum period of the diffractive grating, which can aid in manufacturability.

In other embodiments, base sandwich layer 310 may be fabricated using press molding into thermo-plastic or plastic embossing using a roller drum having a negative impression of the 2D array of 3D diffraction shapes disposed thereon.

Figure 7A:
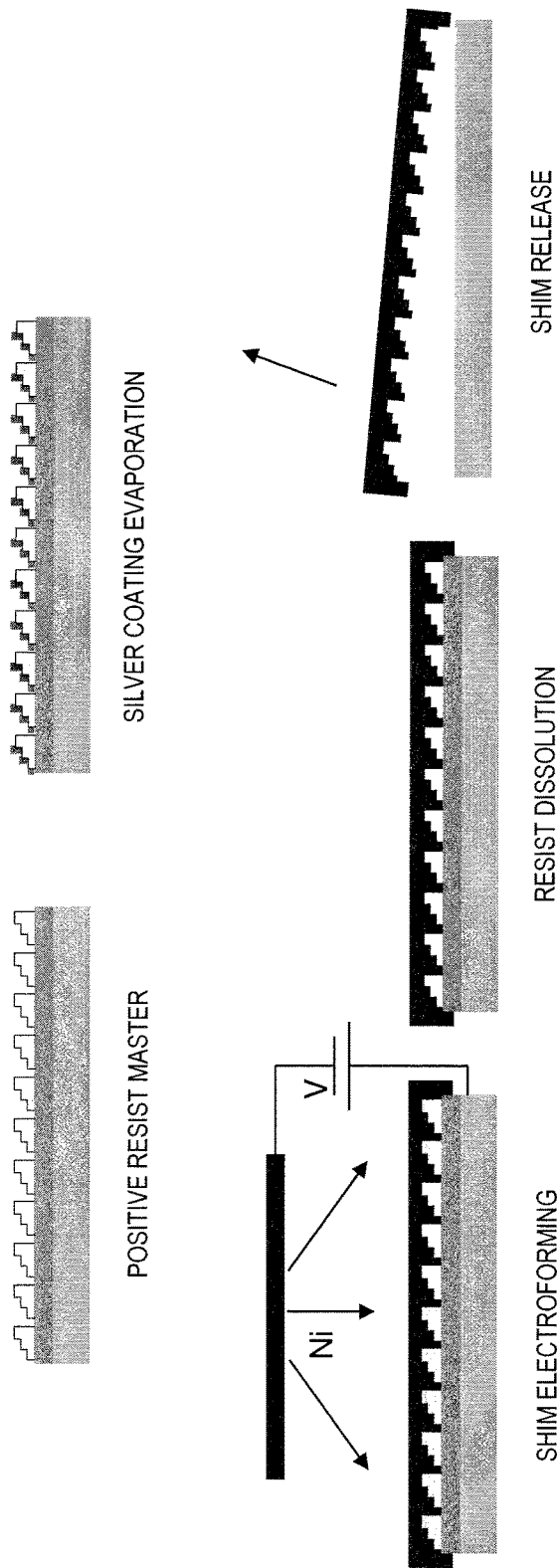
FIGS. 7A-7C illustrate various techniques for mass replication of a diffractive optical combiner, in accordance with embodiments of the disclosure.
Figure 7B:
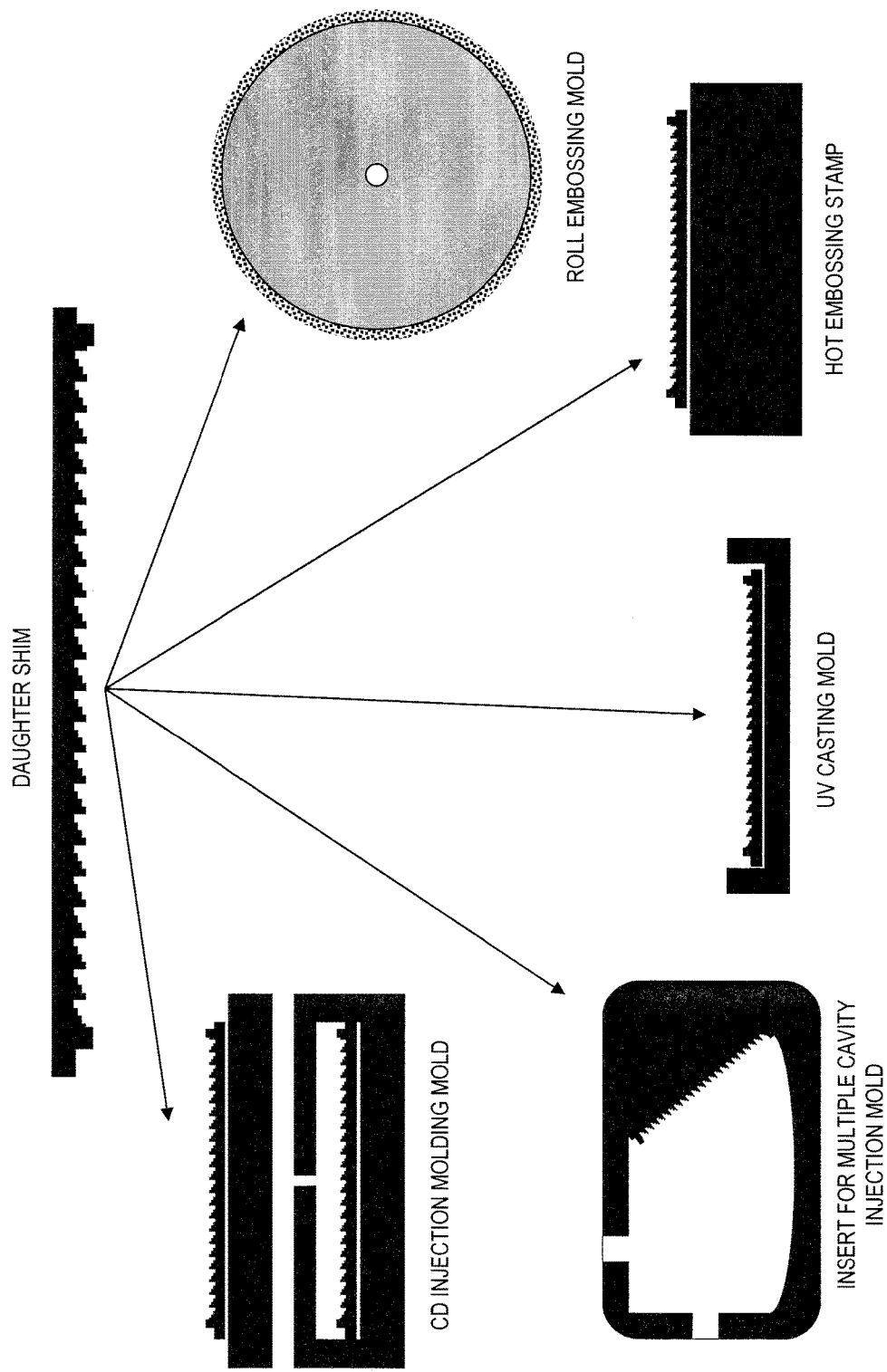
Figure 7C:
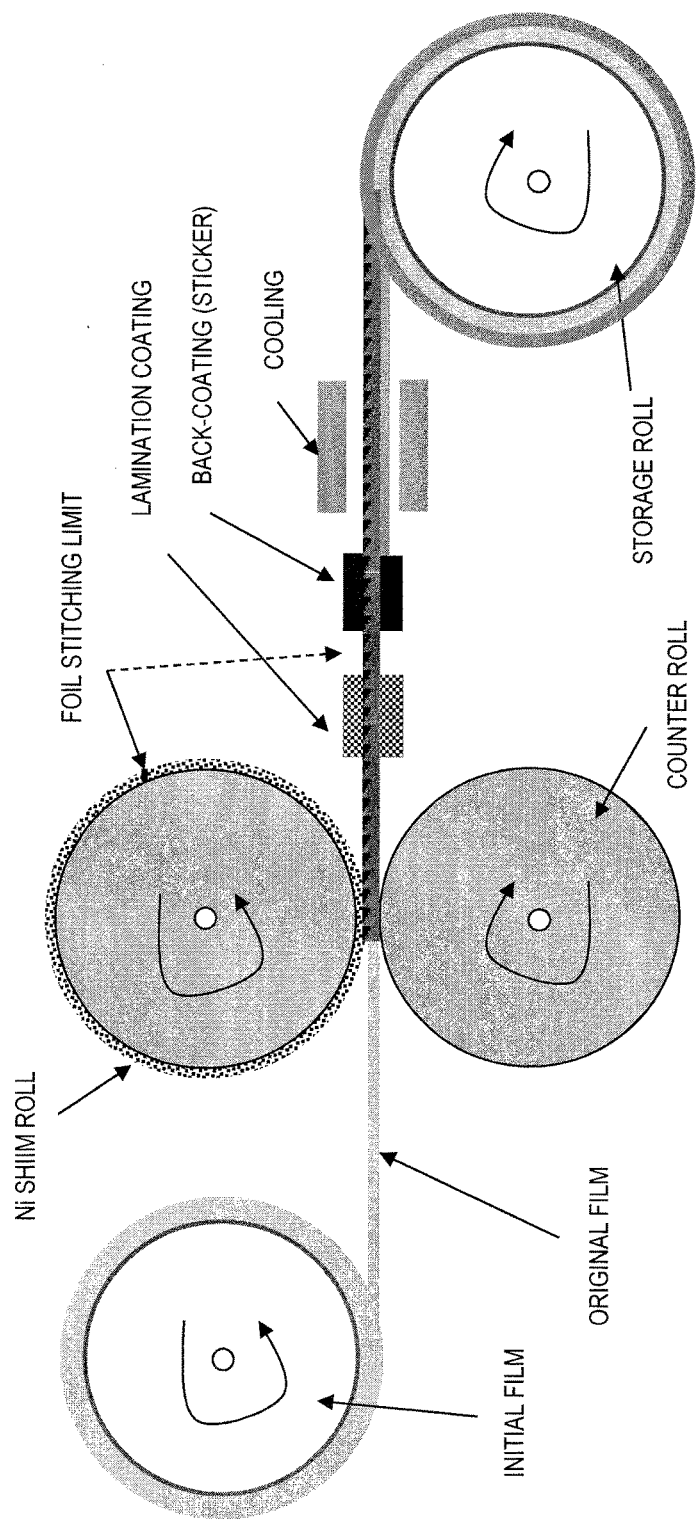

FIGS. 7A-7C illustrate various techniques for mass replication of DOE 340 (that may include a substrate layer not shown in FIG. 3), in accordance with embodiments of the disclosure. FIG. 7A illustrates electroforming of a negative nickel combiner master from a positive resist master. The master can be either produced via micro-lithography or diamond turning. In the case of micro-lithography, the substrate (not shown in FIG. 3 but in some embodiment similar to substrate 305) would typically be flat. The structures produced are negative, similar to the final parts (film). The mold produced on top of these structures is therefore a negative imprint. The replicated film (positive structures again) can be curved in one direction (see FIG. 7B). In the case of diamond turning, the microstructures can be formed on a flat surface (similar to microlithography) or directly on a curved substrate. If produced on a flat substrate, the process to replicate the film is the same as for the lithography enabled master (constrained to 1D curvature and negative structures). If produced on a curved substrate, the structures will be negative, since diamond turning directly produces the final mold.

If the master is directly diamond turned over a non-flat surface, this surface can have curvatures in two directions and then used as a mold. However, in this case it may not be used as a shim for roll-to-roll replication or embossing; rather, injection molding. When using lithography to produce the master, there is a choice to do so in resist or etch down the microstructures within the substrate. In either case, it may be preferable to use the microstructures as a negative pattern on which electro-plating can be used to grow a Nickel layer rather than as a mold. This nickel layer is then peeled off and used as a shim for either roll-to-roll embossing, plate embossing, or as an insert for diamond turning.

When the shim is used as an insert on a 1D curved substrate in an injection molding process, there is no need to stretch the microstructures in order to compensate for conformation onto the 1D surface. If the shim is used to replicate a film to be conformed to a 1D surface, the original microstructures (in the master) have to be compensated (stretched) in order to produce the desired microstructures when the replicated film is conformed to the surface.

FIG. 7B illustrates the use of a negative shim in various plastic replication technology equipment, in accordance with embodiments of the disclosure. Once a mold is fabricated (either via diamond turning or nickel electro-plating as discussed above), the shim or mold can be used in a variety of plastic replication equipment, such as the ones illustrated in FIG. 7B.

FIG. 7C illustrates an example of a roll-to-roll replication of combiner microstructures using the nickel shim described above. FIG. 7C illustrates greater details of a specific roll-to-roll embossing technique in which the nickel shim is applied to a drum and embosses a plastic film, on which a coating as well as an overcoat is applied. In this case the diffractive structures should be stretched in the master design (compensated) in order to produce the desired structures when conformed to the underlying 1D surface.

Figure 8:
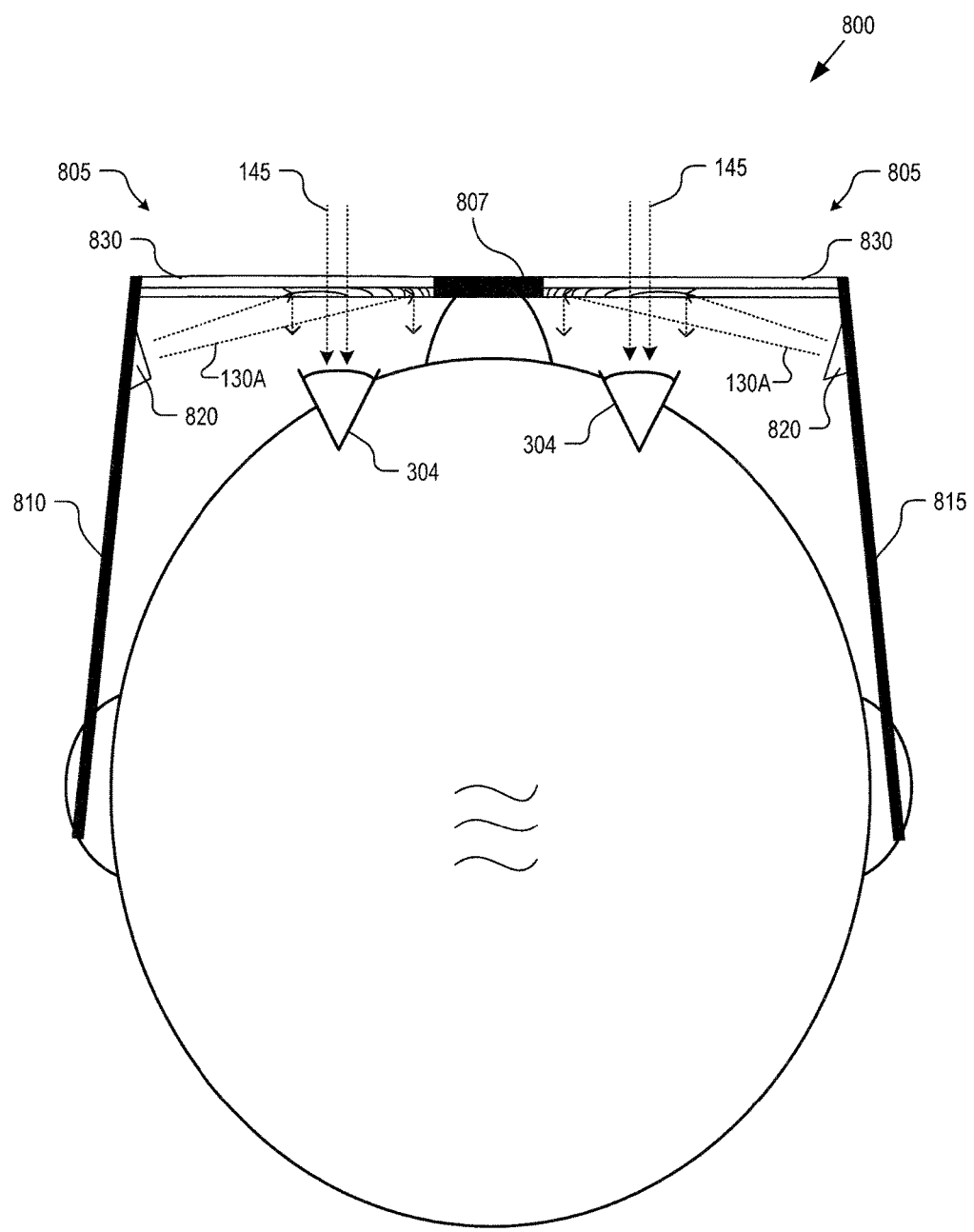
FIG. 8 is a top view of a binocular head mounted display using two see-through displays that each include a curved diffractive optical combiner, in accordance with an embodiment of the disclosure.

FIG. 8 is a top view of a binocular HMD 800 using a pair of curved diffractive optical combiners 805, in accordance with an embodiment of the disclosure. Each curved diffractive optical combiner 805 may be implemented with embodiments of curved diffractive optical combiner 105 or 205. The curved diffractive optical combiner 805 are mounted to a frame assembly, which includes a nose bridge 807, left ear arm 810, and right ear arm 815. Although FIG. 8 illustrates a binocular embodiment, HMD 800 may also be implemented as a monocular HMD.

The curved diffractive optical combiners 805 are secured into an eye glass arrangement that can be worn on the head of a user. The left and right ear arms 810 and 815 rest over the user's ears while nose assembly 807 rests over the user's nose. The frame assembly is shaped and sized to position each curved diffractive optical combiner 805 in front of a corresponding eye 304 of the user. Of course, other frame assemblies having other shapes may be used (e.g., a visor with ear arms and a nose bridge support, a single contiguous headset member, a headband, goggles type eyewear, etc.).

The illustrated embodiment of HMD 800 is capable of displaying an augmented reality to the user. Each curved diffractive optical combiner 805 permits the user to see a real world image via external scene light 145. Left and right (binocular embodiment) image light 130A may be generated by image sources 820 (e.g. image display 115) mounted to left and right ear arms 810 and 815. Image light 130 is seen by the user as a virtual image superimposed over external scene light 145 as an augmented reality. Curved diffractive optical combiners 805 may present the user with 15 degree field of view ("FOV") of augmented reality. In some embodiments, external scene light 145 may be partially blocked or selectively blocked to provide sun shading characteristics and increase the contrast of image light 130.

In one embodiment, the center of image sources 820 is positioned approximately 31 mm from their respective curved diffractive optical combiners 805. In one embodiment, reflected image light 130B is reflected at approximately a 35 degree angle from the image light 130A that is emitted from image sources 820.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An optical apparatus for a head-worn display, the optical apparatus comprising:
    a first optical element having an eye-ward facing surface and an external world facing surface substantially opposite of the eye-ward facing surface; and
    a diffractive optical element ("DOE") adhered to the eye-ward facing surface to substantially follow a curvature of the eye-ward facing surface of the first optical element, wherein the DOE includes a partially reflective diffraction grating configured to direct a portion of image light in an eye-ward direction, the image light incident through an eye facing side of the DOE, and wherein the curvature of the eye-ward facing surface of the first optical element has a reflective optical power configured to collimate the image light within an eyebox sized area,
    wherein the external world facing surface of the first optical element follows the curvature of the eye-ward facing surface to give the first optical element substantially zero transmissive optical power from a perspective of scene light encountering the first optical element, wherein the scene light is propagating in the eye-ward direction,
    wherein the DOE is configured to have magnifying optical power to collimate the image light within the eyebox sized area, wherein the magnifying optical power is along a second axis and the reflective optical power of the curvature of the eye-ward facing surface is along a first axis different from the second axis, and wherein the reflective optical power and the magnifying optical power are configured to influence astigmatism.

2. The optical apparatus of claim 1, wherein the eye-ward facing surface is a cylindrical surface having the reflective optical power along the first axis.

3. The optical apparatus of claim 1, wherein the eye-ward facing surface is a toroidal surface having the reflective optical power along the first axis and a second optical power along the second axis.

4. The optical apparatus of claim 3, wherein the first axis and the second axis are approximately orthogonal to each other.

5. The optical apparatus of claim 1, wherein the DOE further comprises:
    a base sandwich layer having a first index of refraction and including a first side facing the eye facing side of the DOE, wherein the partially reflective diffraction grating includes:
        a two-dimensional ("2D") array of three-dimensional ("3D") diffraction element shapes disposed in the first side of the base sandwich layer; and
        partially reflective elements each coating one of the 3D diffraction element shapes and conforming thereto, wherein the partially reflective elements collectively form the partially reflective diffraction grating having magnifying optical power for the image light incident through the eye facing side of the DOE; and
    a finishing sandwich layer disposed over the partially reflective elements having a second index of refraction substantially equal to the first index of refraction of the base sandwich layer such that scene light incident through a world facing side of the DOE passes through the DOE substantially without diffraction while the image light incident through the eye facing side is reflected and magnified via the partially reflective diffraction grating.

6. The optical apparatus of claim 5, wherein the partially reflective diffraction grating has off-axis optical power that receives the image light incident upon the eye facing side at a first angle and reflects the image light along a reflection path having a second angle, wherein the second angle is determined both by the surface normal and the gradient of the phase profile.

7. The optical apparatus of claim 5, wherein the base sandwich layer includes a second side opposite the first side and facing the world facing side, the DOE further comprising:
    an optically transmissive substrate physically mated to the second side of the base sandwich layer to provide mechanical support to the base sandwich layer and the reflective diffraction grating.

8. The optical apparatus of claim 5, wherein the partially reflective elements include at least one of silver or CrO2.

9. The optical apparatus of claim 1, wherein the image light is received from a micro-display.

10. A head mounted display ("HMD") for combining image light with external scene light, the HMD comprising:
    an image display to generate the image light;
    a first optical element having an eye-ward facing surface and an external world facing surface substantially opposite of the eye-ward facing surface;
    a diffractive optical combiner ("DOE") adhered to the eye-ward facing surface to substantially follow a curvature of the eye-ward facing surface of the first optical element, wherein the DOE includes partially reflective diffraction grating configured to direct a portion of the image light in an eye-ward direction, the image light incident through an eye facing side of the DOE, and wherein the curvature of the eye-ward facing surface of the first optical element has a reflective optical power configured to collimate the image light within an eyebox sized area,
    wherein the external world facing surface of the first optical element follows the curvature of the eye-ward facing surface to give the first optical element substantially zero transmissive optical power from a perspective of the scene light encountering the first optical element, wherein the scene light is propagating in the eye-ward direction, wherein the DOE is configured to have magnifying optical power to collimate the image light within the eyebox sized area, wherein the magnifying optical power is along a second axis and the reflective optical power of the curvature of the eye-ward facing surface is along a first axis different from the second axis, and wherein the reflective optical power and the magnifying optical power are configured to influence astigmatism; and a frame assembly for wearing on a head of a user to support the image display and the first optical element.

11. The HMD of claim 10, wherein the eye-ward facing surface is a cylindrical surface having the reflective optical power along the first axis.

12. The HMD of claim 10, wherein the eye-ward facing surface is a toroidal surface having the reflective optical power along the first axis and a second optical power along the second axis.

13. The HMD of claim 12, wherein the first axis and the second axis are substantially orthogonal to each other.

14. The HMD of claim 10, wherein the DOE further comprises:

a base sandwich layer having a first index of refraction and including a first side facing the eye facing side of the DOE, wherein the partially reflective diffraction grating includes:
  a two-dimensional ("2D") array of three-dimensional ("3D") diffraction element shapes disposed in the first side of the base sandwich layer; and
  partially reflective elements each coating one of the 3D diffraction element shapes and conforming thereto, wherein the partially reflective elements collectively form the partially reflective diffraction grating having magnifying optical power for the image light incident through the eye facing side of the DOE; and a finishing sandwich layer disposed over the partially reflective elements having a second index of refraction substantially equal to the first index of refraction of the base sandwich layer such that external scene light incident through a world facing side of the DOE passes through the DOE substantially without diffraction while the image light incident through the eye facing side is reflected and magnified via the partially reflective diffraction grating.

15. The HMD of claim 14, wherein the partially reflective diffraction grating has off-axis diffractive optical power that receives the image light incident upon the eye facing side at a first angle and reflects the image light along a reflection path having a second angle, wherein the second angle is determined both by the surface normal and the gradient of the phase profile.

16. The HMD of claim 14, wherein the base sandwich layer includes a second side opposite the first side and facing the world facing side, the DOE further comprising:

an optically transmissive substrate physically mated to the second side of the base sandwich layer to provide mechanical support to the base sandwich layer and the reflective diffraction grating.

17. The HMD of claim 14, wherein a center of the partially reflective diffraction grating is offset from the user's center of vision, and wherein the partially reflective elements decrease in size in a direction away from the center of the partially reflective diffraction grating.

18. The HMD of claim 17, wherein a y-radius of curvature of the partially reflective diffraction grating is infinite, and an x-radius of curvature of the partially reflective diffraction grating defines the magnifying optical power.

19. The HMD of claim 10, wherein the image light is received from a micro-display.

* * * * *